(No Model.)

R. WESTON.
HORSESHOE.

No. 270,713. Patented Jan. 16, 1883.

WITNESSES:
Fred. G. Dieterich
F. G. Finkel

INVENTOR.
Robt. Weston,
by C. A. Snow & Co.
ATTORNEYS

UNITED STATES PATENT OFFICE.

ROBERT WESTON, OF NORWALK, OHIO.

HORSESHOE.

SPECIFICATION forming part of Letters Patent No. 270,713, dated January 16, 1883.

Application filed September 19, 1882. (No model.)

*To all whom it may concern:*

Be it known that I, ROBERT WESTON, of Norwalk, in the county of Huron and State of Ohio, have invented certain new and useful Improvements in Horseshoes; and I do hereby declare that the following is a full, clear, and exact description of the invention, which will enable others skilled in the art to which it appertains to make and use the same, reference being had to the accompanying drawings, which form a part of this specification.

This invention relates to horseshoes, and has for its object to provide a simple, inexpensive, and efficient shoe that will readily yield or "give" to the tread of the horse.

Figure 1:
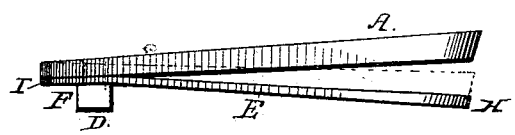
Figure 2:
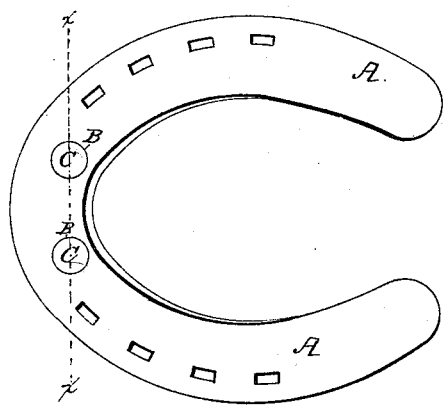
Figure 3:
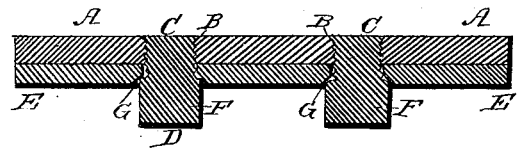

In the drawings, Figure 1 is a side view of my improved shoe. Fig. 2 is a top view. Fig. 3 is a transverse sectional view on the line $x\,x$, Fig. 2.

Referring to the drawings, A designates the horseshoe proper, which is formed without calks, and is adapted to be secured to the hoof in the usual manner. The horseshoe is provided at its front with screw-threaded perforations B B to receive the screw-threaded shanks C of large-headed screws D D. The latter secure an under elastic plate, E, conforming in shape to the horseshoe, by reason of their heads F entering countersunk perforations G G in plate E. This plate E is elastic, and projects rearwardly and downwardly, leaving a space between its top surface and the under surface of the horseshoe. By this arrangement the heads F F form a toe-calk, and the rear ends, H H, of plate E extend downwardly to about the same level as said heads. The front portion, I, of plate E is comparatively thin, while the plate gradually thickens towards its rear ends, where the most strength is required.

The operation and advantages of my invention will be readily understood. The shoe is first secured to the hoof, and then the elastic plate is attached, the latter being of course readily removable. While in use the tread of the horse will compress the plate up against the horseshoe, when, as soon as the pressure is removed, the plate will spring to its normal position. The shoe is especially convenient and comfortable to the horse, and no wear of the shoe proper need ensue, as when one plate is worn another may be substituted.

I claim as new—

The combination, with the horseshoe having screw-threaded perforations at its toe, of the under elastic plate, of substantially the same contour, having perforations at its toe and extending rearwardly and downwardly, and the large-headed securing-screws, as set forth.

In testimony that I claim the foregoing as my own I have hereto affixed my signature in presence of two witnesses.

ROBERT WESTON.

Witnesses:
HENRY S. MITCHELL,
ALBERT J. WESTON.